United States Patent
Johnson

(10) Patent No.: US 6,844,873 B2
(45) Date of Patent: Jan. 18, 2005

(54) REVERSE CANTILEVER ASSEMBLY FOR INPUT DEVICES

(76) Inventor: Peter W. Johnson, 1505 D Lake Washington Blvd., Seattle, WA (US) 98122

( * ) Notice: Subject to any disclaimer, the term of this patent is extended or adjusted under 35 U.S.C. 154(b) by 276 days.

(21) Appl. No.: 09/802,449

(22) Filed: Mar. 9, 2001

(65) Prior Publication Data

US 2002/0171621 A1 Nov. 21, 2002

(51) Int. Cl.$^7$ ................................................. G09G 5/08
(52) U.S. Cl. ..................... 345/163; 345/156; 345/157; 345/164; 345/165; 345/166; 345/167; 200/343; 200/400
(58) Field of Search ................................. 200/343, 400; 345/163

(56) References Cited

U.S. PATENT DOCUMENTS

| | | | | |
|---|---|---|---|---|
| 3,324,268 A | * | 6/1967 | Adams ........................ 200/288 |
| 3,564,182 A | * | 2/1971 | Habecker .................... 200/246 |
| 3,953,697 A | * | 4/1976 | Teichert ...................... 200/243 |
| 4,259,558 A | | 3/1981 | Croft et al. .................. 200/283 |
| 4,268,726 A | | 5/1981 | Chu ............................ 179/164 |
| 4,314,113 A | | 2/1982 | Nelson ....................... 200/5 R |
| 4,618,754 A | | 10/1986 | Gross ....................... 200/159 B |
| 4,885,435 A | | 12/1989 | Dix ........................... 200/1 B |
| 5,182,967 A | | 2/1993 | Yoshizawa et al. ........... 74/834 |
| 5,268,674 A | * | 12/1993 | Howard et al. ............. 345/163 |
| 5,414,445 A | | 5/1995 | Kaneko et al. ............. 345/163 |
| 5,570,607 A | | 11/1996 | Yoshizawa .................. 74/110 |
| 5,898,424 A | * | 4/1999 | Flannery ..................... 345/163 |
| 5,934,454 A | | 8/1999 | Burleson et al. ............. 200/343 |
| 6,002,093 A | | 12/1999 | Hrehor, Jr. et al. ......... 200/345 |
| 6,005,209 A | | 12/1999 | Burleson et al. ............. 200/343 |
| 6,005,553 A | | 12/1999 | Goldstein et al. ........... 345/163 |
| 6,031,518 A | | 2/2000 | Adams et al. .............. 345/156 |
| 6,040,542 A | | 3/2000 | Wolfe ........................ 200/512 |
| 6,041,477 A | | 3/2000 | Rentsch et al. ............... 16/225 |
| 6,323,843 B2 | * | 11/2001 | Giles et al. ................. 345/163 |
| 6,417,842 B1 | * | 7/2002 | Shattuck .................... 345/163 |
| 6,469,693 B1 | * | 10/2002 | Chiang et al. .............. 345/163 |
| 6,580,419 B1 | * | 6/2003 | O'Keeffe et al. ........... 345/163 |

* cited by examiner

*Primary Examiner*—Dennis-Doon Chow
*Assistant Examiner*—Ming-Hun Liu

(57) ABSTRACT

A computer pointing device, such as a mouse or trackball, includes a reverse cantilever button assembly to match strength-related variations in user hand size. In one embodiment a button assembly is built with two cantilever beams, the fulcrums for each beam being at opposite ends of the button assembly. The stiffness of the two beams can be selected to obtain an increasing, decreasing, or constant force profile necessary to activate the associated electronic switch as one moves along the external surface of the button assembly from the palm end toward the fingertip end. An increasing force profile provides lower actuating force for operators with smaller hands, while providing greater tactile feedback for operators with larger hands.

11 Claims, 2 Drawing Sheets

REVERSE CANTILEVER ASSEMBLY FOR INPUT DEVICES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

This invention relates to actuating mechanisms for hand or foot activated devices and more particularly to external buttons used to actuate electromechanical switches inside of computer pointing devices such as is what is commonly called a "computer mouse" and similar devices.

Pointing devices for controlling cursor movement and entering commands into a computer are well known in the art. Pointing devices typically include some sort of positioning element, such as a rotatable ball or photonic scanner in the device or a track ball manipulated by the hand. Additionally, there are typically one or more keys or "buttons" on the input device. A computer user selects actions (i.e. provides user input to the computer) by pressing ("clicking") a button after manipulating the positioning element. The external surface of the button and its associated internal components inside the device make up what is referred to as the button assembly.

The button assembly typically actuates an electronic switch that is electrically coupled to the computer. The button assembly usually has a spring-like character since its lever arm, usually made of molded plastic or other suitable material, is deformed when depressed by the finger, then returns to its undeformed or default position when the pressure from the finger is released. The electronic switch under the button assembly often consists of rigid plastic housing with a separate spring-loaded mechanical switch protruding from the top of the housing. When the button assembly is depressed and displaced by the force from the finger, the electronic switch moves and "clicks" when displaced the minimum required distance to actuate the switch.

A button assembly can be mechanically modeled as a plastic beam with a fulcrum on one end, this arrangement in known as a cantilever design. Many finger-actuated devices/switches on computer pointing devices employ some sort of cantilever design. However, not all computer users have the same size hand. Thus, it might be more difficult for some computer users, e.g. with short fingers, to actuate a button of a pointing device designed for users with longer fingers because their fingers do not reach sufficiently far onto the button.

Therefore, it is desirable to provide a computer pointing device with a button assembly design that accounts for differences in user hand size and strength.

SUMMARY OF THE INVENTION

A reverse cantilever beam button assembly provides a selectable force profile along the length of the button in a computer pointing input device. In a particular embodiment, the force profile increases as one moves from the palm end to the fingertip end of the button. This embodiment provides a lower force required for actuation of the input device for users with smaller hands and increased tactile feedback for users with larger hands. In another embodiment the force profile is constant along the length of the button. The button assembly can be assembled into the housing or body of a computer pointing device, or can be made in an integrated fashion, typically using molded plastic, with the housing or body.

In one embodiment the computer pointing device is a mouse that has a body configured to accept the user's palm, with the user's fingers extending away from the palm portion. The finger depresses an external surface of the button assembly to actuate an electro-mechanical switch. In another embodiment the computer pointing device is what is commonly known as a "track ball". In one embodiment the button assembly includes two cantilever beams and two fulcrums. A first cantilever fulcrum is essentially at one end of the button assembly, and a second cantilever fulcrum is toward the opposite end of the button assembly. The second cantilever and fulcrum has a stiffness that is less than the stiffness making up the first cantilever and fulcrum, although the designations of "first" and "second" is arbitrary. This way the button assembly will bend primarily about the second fulcrum and can reverse or neutralize the force profile of a conventional cantilever button assembly. Stiffness about one fulcrum compared to the stiffness about the other fulcrum can be selected to achieve a decreasing, constant or increasing force profile along the external surface of the button assembly.

DESCRIPTION OF THE PREFERRED EMBODIMENTS

1. Introduction

A computer pointing device with a reverse cantilever or reverse lever button assembly provides a button requiring decreasing force to actuate ("click") the electronic switch with decreasing distance from the palm portion of the device. This design allows users with smaller, and presumably weaker, hands/fingers, to more easily click the button, hopefully lowering the potential for fatigue and possible injury. In conventional button assemblies, a large-handed individual will activate the button assembly further away from the fulcrum compared to a small-handed individual. Due the nature of the cantilever design, it will take less force for the large-handed individual to activate the button assembly and electronic switch relative to the small-handed individual. This design may be contrary to the anatomical biomechanics related to stature and hand size. Smaller-handed and often weaker individuals are required to apply more force to the button assembly compared to the larger-handed and often stronger individuals.

2. An Exemplary Computer Mouse

Figure 1:
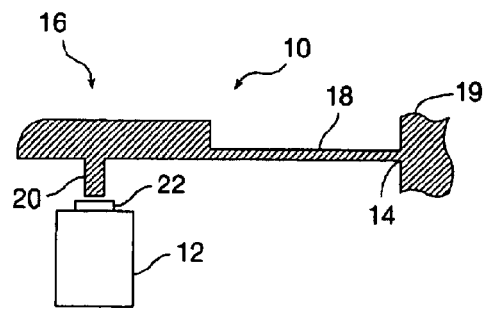
FIG. 1 is a simplified representation of a conventional mouse button and electronic switch.

FIG. 1 is a simplified representation of a conventional mouse button 10 and electronic switch 12. Surrounding portions of the device are not shown for simplicity of illustration. The button assembly includes a fulcrum 14 about which the button moves in a slight arc, the external visible surface of the button assembly 16 extends away from the fulcrum (i.e. away from the user's hand) and a spring beam 18. The spring beam can be made of molded plastic or other suitable material with a molded plastic hinge joint serving as the fulcrum and connecting the button assembly to the housing 19 of the device. The electronic switch 12 beneath the button is configured to be electrically coupled to a computer or other device. Depressing the external surface of the button assembly 16 actuates the switch 12 by pushing the plunger 20 against a spring-loaded movable switch element 22, which returns to a default position and switch state after the actuating force has been removed from the button assembly 16.

The force required to actuate the button assembly 16 decreases with increasing distance from the fulcrum 14 because of the leverage obtained. Thus, the larger the user's hand, the further the point of force application on the button assembly 16 relative to the fulcrum 14, and the easier it is for the user to actuate the button. In contrast, individuals with smaller, weaker hands will have a point of force application on the button assembly 16 closer to the fulcrum 14 and will be required to apply more force relative to larger-handed individuals. The mechanics of this arrangement opposes the strength-related mechanics related to human stature and hand size. The difference in this force is significant and there is often an order of magnitude difference between the forces applied to the external surface the button assembly 16 nearest the fulcrum 14 and the external surface of the button assembly furthest away from the fulcrum to actuate the underlying electronic switch.

For example, the actuation force required to actuate a conventional mouse button was measured as a function of distance along the button. The button is 3.1 cm wide and 3.5 cm long (palm-finger direction). The measured forces (Newtons) versus distance (cm from the finger end) are provided in Table 1.

TABLE 1

| Distance (cm) | Force (N) |
| --- | --- |
| 0.5 | 1.0 |
| 1.0 | 0.8 |
| 1.5 | 0.65 |
| 2.0 | 0.55 |
| 2.5 | 0.5 |
| 3.0 | 0.45 |

Figure 2:
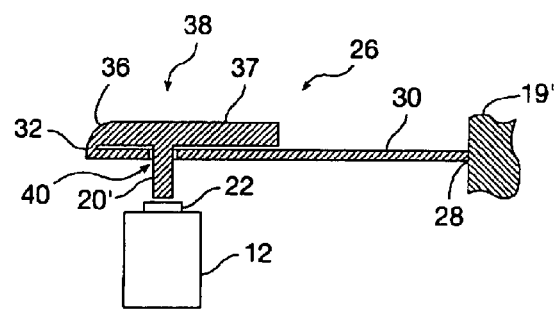
FIG. 2 is a simplified representation of a mouse button and electronic switch according to an embodiment of the present invention.

FIG. 2 is a simplified representation of a reverse cantilever button assembly 26 and electronic switch 12 assembled into a housing 19' of a pointing device according to an embodiment of the present invention. Alternatively, the button assembly could be molded with the housing, rather than being attached to it by gluing, heat welding, mechanical fastening, or similar techniques. The reverse cantilever button assembly has a first fulcrum 28 at the point where the button assembly is attached to the device housing 19' or body and a second fulcrum 32 at the end of spring beam 30. The spring beam is a cantilevered beam, as is the button portion 36, which is attached to the spring beam through the second fulcrum. The button portion includes the external surface 37 of the button assembly, which is configured to be contacted by the finger, thumb, foot, or other portion of the user and will be referred to as the "switch button" for purposes of illustration. In this embodiment essentially the entire portion of the second cantilevered beam has an exposed external surface, but in other embodiments a portion or portions of the second cantilevered beam might not be exposed.

The second fulcrum can be implemented as a molded plastic flexible hinge or have a plurality of implementations using other materials. The button plunger 20' extends through a hole 40 in the spring beam 30 to actuate the electronic switch 12 when the switch button 22 is depressed. Extending the plunger through the spring beam provides a simple and compact configuration. Alternatively, the button plunger can be offset to either side of the spring beam, rather than extending through a hole in the beam. In either configuration, the movable switch element 22 is actuated with force from the finger to the external surface (finger portion) of the button assembly 38, and not the underlying spring beam 30.

The force applied by the finger to the external surface of the button assembly 38 to actuate the electronic switch button 22 can be the same or increase moving from the first fulcrum 28 to the second fulcrum 32, depending on the ratio of the spring constants between the two fulcrums. In one embodiment, the spring constant of the first fulcrum 28 can be higher than the spring constant of the second fulcrum 32 to achieve an increasing force profile when the force is applied to the external surface of the button assembly 26 moving from the first fulcrum 28 to the second fulcrum 32. In another embodiment, the spring constant of the first fulcrum 28 can be lower than the spring constant of the second fulcrum 32 to achieve an decreasing force profile when the force is applied to the external surface of the button assembly 38 moving from the first fulcrum 28 to the second fulcrum 32. In yet another embodiment, the spring constant of the first fulcrum 28 can designed to be a proportion of the second fulcrum 32 to achieve an essentially constant force profile across the external surface of the button assembly 38 when moving from the first fulcrum 28 to the second fulcrum 32. These embodiments can be achieved by molding the button assemblies from a plastic material, such as acrylonitrile butadiene styrene ("ABS") or other plastic, with the button assembly typically snapped or glued into place within the housing of the device. ABS plastic is particularly desirable because of its strength, resiliency, ease of fastening to the housing, and molding properties. The spring constants can be selected according to the thickness and length of the hinge/fulcrum section for a particular material, with a thinner section producing a lower spring constant.

Thus, the present invention enables a selective force profile for a button assembly from an increasing force profile, an essentially constant force profile, or a decreasing force profile moving along the external surface of the button assembly 38 from first fulcrum 28 to the second fulcrum 32. In a constant force profile implementation, a 3.1 cm wide by 3.5 cm long (palm to finger direction) button assembly has an electronic switch with an actuation force of 0.60 N. The finger force needed to activate ("click") the button is 0.6 N along the centerline of the button from the first fulcrum to the second fulcrum with a force variation of about ±0.15 N or less, and a force variation along the transverse direction of about ±0.15 N.

An example of an increasing force profile with a two-cantilever button assembly is given below in Table 2. The external surface if the button is 3.1 cm wide and 3.5 cm long (palm to finger direction). The button assembly contacts an electro-mechanical switch that has an actuation force of 0.60 N located at 2.0 cm. The transverse variation in force is about ±0.15 N or less. An increasing force profile may be desirable for persons with larger hands because the higher force provides greater tactile feedback and thus better control over button actuation.

TABLE 2

| Distance (cm) | Force (N) |
|---|---|
| 0.0 | 0.60 |
| 1.0 | 0.65 |
| 1.5 | 0.70 |
| 2.0 | 0.75 |
| 2.5 | 0.85 |
| 3.0 | 1.00 |
| 3.5 | 1.20 |

Figure 3:
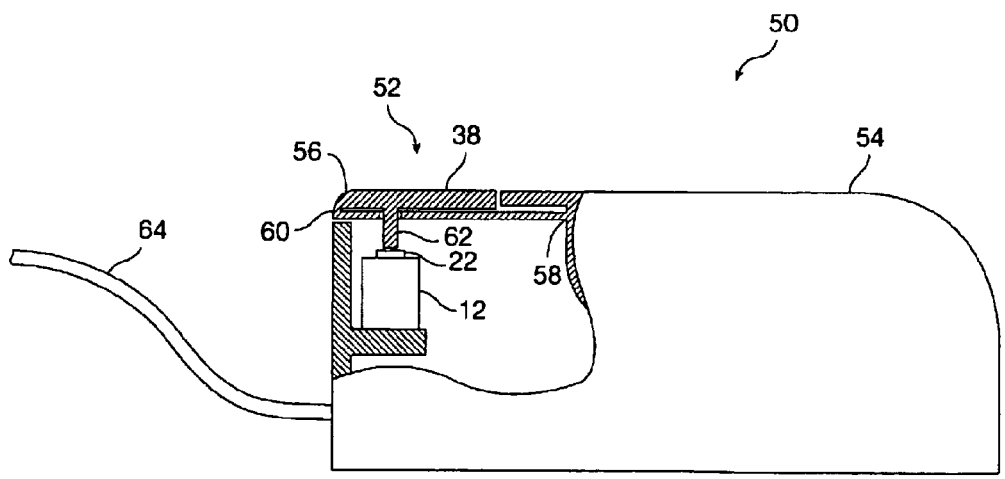
FIG. 3 is a simplified partial cross section of a mouse with a reverse cantilever button according to an embodiment of the present invention.

FIG. 3 is a simplified partial cross section of a computer pointing device 50 with a reverse cantilever button assembly 52 according to an embodiment of the present invention. The mouse includes a palm portion 54 configured to fit into the hand of a user. In use, the user's fingers extend from the palm portion 54 to the distal end 56 of the finger portion 38 of the button. The button includes a first fulcrum 58 near the palm section typically under the metacarpalphalangeal joint and a second fulcrum 60 near the distal end of the button which typically resides under or beyond the end of the user's fingertip. In this embodiment the button plunger 62 and associated electronic switch 12 with movable switch element 22 is not centered in the finger portion of the button. A cable 64 is provided to connect the device to a computer, but a wireless connection could be provided.

3. An Exemplary Trackball

Figure 4:
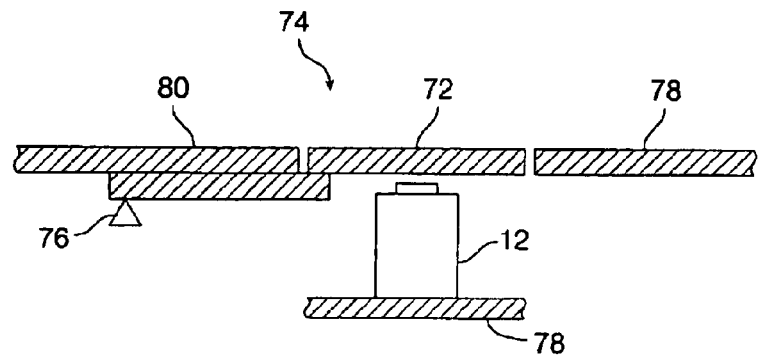
FIG. 4 is a simplified top view of a button assembly inside a conventional trackball pointing device.

FIG. 4 is a simplified top view section of a button assembly 70 inside a conventional trackball pointing device. An electronic switch 12 is placed behind a thumb pad (switch button) 72 on a thumb button 74 movable in a small arc about a fulcrum 76 relative to the trackball housing 78. The fulcrum is proximate to a palm portion 80 of the trackball housing, thus the force required to be applied to the thumb pad 72 in order to actuate the switch decreases as one moves further from the palm portion of the device.

Figure 5:
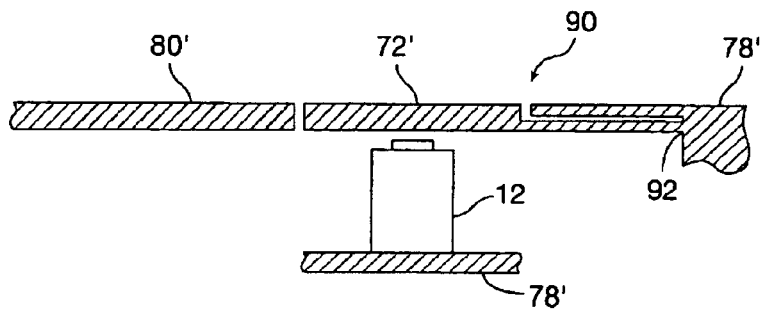
FIG. 5 is a simplified top view of a button assembly inside a trackball pointing device according to another embodiment of the present invention.

FIG. 5 is a simplified top view section of a button assembly 90 inside a trackball pointing device according to another embodiment of the present invention. In this instance the fulcrum 92 is distal from the palm portion 80' of the trackball housing 78' i.e. nearer the thumb tip. Thus the force required to be applied to the thumb pad 72' increases as one moves from the palm end of the thumb pad to the distal end of the thumb pad. This increasing profile is more consistent with ergonomic considerations, for example, allowing a person with smaller and presumably weaker hands to more easily actuate the button, and providing more tactile feedback for persons with larger hands.

Figure 6:
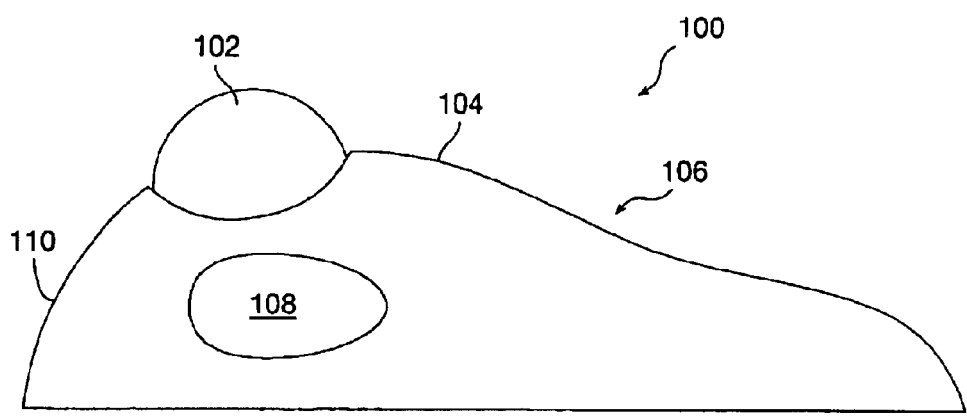
FIG. 6 is a simplified section of a trackball pointing device according to another embodiment of the present invention.

FIG. 6 is a simplified section of a trackball pointing device 100 according to another embodiment of the present invention. A trackball 102 is in a housing 104 having a palm portion 106 configured to accept a hand. The fingers manipulate the trackball, and a thumb switch button 108 is configured to be actuated by the user's thumb. Like the button assembly shown in FIG. 5, above, the button has a fulcrum (not shown as it lies within the housing) between the thumb switch button and a distal end 110 of the trackball housing. Thus, the actuating force necessary to apply to the thumb switch button decreases with increasing distance from the distal end. In other words, when a user's hand is resting on the palm portion 106 of the trackball housing, a user with a shorter thumb can advantageously actuate the thumb switch with less applied force than would be required if the fulcrum was on the opposite side (from the distal end) of the thumb switch button.

While the invention has been described above with reference to specific embodiments, modifications and equivalents may be apparent or become apparent to those skilled in the art. For example, while an electronic switch with a simple plunger is illustrated, other types of electronic switches, such as a levered microswitch where switch, lever, and small roller (all contained on the switch unit), could be used. Similarly, the fulcrums have been shown as being live spring hinges, but could be pivots or be movable fulcrums to change the stiffness of the beam assemblies. While specific embodiments are molded from plastic, other materials, such as metals, could be used for some or several of the components, such as the fulcrum and beam. These and other variations are intended to fall within the scope of the invention; therefore, the invention is to be limited only as recited in the following claims.

I claim:

1. A button assembly comprising:
    a first cantilevered beam (30) having a first end and a second end, the first end being movably coupled to an electronic input device through a first fulcrum (28) at the first end;
    a second cantilevered beam (36) having
        an exposed button portion (37), the second cantilevered beam being movably coupled to the first cantilevered beam through a second fulcrum (32); and
    a plunger (20') attached to the second cantilevered beam and extending from the second cantilevered beam through the first cantilevered beam between the first end and the second end of the first cantilevered beam.

2. The button assembly of claim 1 wherein the button assembly is molded from plastic as a single piece.

3. A computer pointing input device comprising:
    a housing;
    a palm portion of the housing configured to receive a user's hand;
    a distal portion of the housing extending generally away from the palm potion; and
        a switch button having a palm end and a distal end, the switch button being configured to actuate an electronic switch within the computer pointing input device upon application of sufficient force to the switch button by the user, the switch button being movably coupled to the housing so as to move about a fulcrum, the fulcrum being nearer to the distal end than to the palm end of the switch button, wherein a first force is required to be applied to the switch button to actuate the electronic switch at the distal end and a second force is required to be applied to the switch button to actuate the electronic switch at the palm end, the first force being at least two times greater than the second force and a distance from the palm end of the switch button to the distal end of the switch button is at least 3 cm.

4. The computer pointing input device of claim 3 wherein the first force is about 1 Newton and the second force is about 0.5 Newtons.

5. A computer pointing input device comprising:

a housing;

a palm portion of the housing configured to receive a user's hand;

a distal portion of the housing extended generally away from the palm portion; and a switch button having a palm end and a distal end, the switch button being configured to actuate an electronic switch within the computer pointing input device upon application of sufficient force to the switch button by the user, the switch button being movably coupled to the housing so as to move about a fulcrum, the fulcrum being nearer to the distal end than to the palm end of the switch button;

a spring beam having a first end and a second end, the spring beam being coupled to the switch button through the fulcrum at the first end and being coupled to the housing at the second end through a second fulcrum, wherein the first force is at least two times greater than the second force and a distance from the palm end of the switch button to the distal end of the switch button is at least 3 cm.

6. The computer pointing input device of claim 5 wherein the first force is about 1.2 Newtons and the second force is about 0.6 Newtons.

7. A computer pointing input device comprising:

a housing;

a palm portion of the housing configured to receive a user's hand;

a distal portion of the housing extending generally away from the palm portion; and a switch button having a palm end and a distal end, the switch button being configured to actuate an electronic switch within the computer pointing input device upon application of sufficient force to the switch button by the user, the switch button being movably coupled to the housing so as to move about a fulcrum, the fulcrum being nearer to the distal end than to the palm end of the switch button;

a spring beam having a first end and a second end, the spring beam being coupled to the switch button through the fulcrum at the first end and being coupled to the housing at the second end through a second fulcrum, wherein a first force is required to be applied to the switch button to actuate the electronic switch at the distal end and a second force is required to be applied to the switch button to actuate the electronic switch at the palm end, a difference between the first force and the second force being equal to or less than 0.15 Newtons, wherein a distance from the distal end of the switch button and the palm end of the switch button is at least 3 cm.

8. The computer pointing device of claim 7 wherein the first force is between about 0.5–0.7 Newtons and the second force is between about 0.5–0.7 Newtons.

9. A computer pointing input device comprising:

a housing;

a palm portion of the housing configured to receive a user's hand;

a spring beam flexibly coupled to the housing through a first fulcrum;

a switch button having a palm end and a finger end, the switch button being flexibly coupled to the spring beam through a second fulcrum, the second fulcrum being nearer to the finger end of the switch button than to the palm end of the switch button;

a plunger coupled to the switch button and extending toward an electronic switch, the plunger being configured to actuate the electronic switch upon application of a sufficient force to the switch button by the user, wherein the plunger extends through the spring beam between the first fulcrum and the second fulcrum.

10. A computer pointing input device comprising:

a housing;

a palm portion of the housing configured to receive a user's hand;

a spring beam flexibly coupled to the housing through a first fulcrum;

a switch button having a palm end and a finger end, the switch button being flexibly coupled to the spring beam through a second fulcrum, the second fulcrum being nearer to the finger end of the switch button than to the palm end of the switch button;

a plunger coupled to the switch button and extending toward an electronic switch, the plunger being configured to actuate the electronic switch upon application of a sufficient force to the switch button by the user wherein a distance between the finger end of the switch button and the palm end of the switch button is about 3 cm and the sufficient force varies from a first force at the finger end of the switch button to a second force at the palm end of the switch button, the first force being greater than the second force by a factor of about two.

11. The computer pointing device of claim 10 wherein the first force is less than about 1.2 Newtons and the second force is less than about 0.6 Newtons.

* * * * *